United States Patent
Dry

(10) Patent No.: US 6,626,977 B1
(45) Date of Patent: *Sep. 30, 2003

(54) DIRECT SMELTING PROCESS AND APPARATUS

(75) Inventor: Rod Dry, City Beach (AU)

(73) Assignee: Technological Resources Pty Ltd., Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/723,332

(22) Filed: Nov. 28, 2000

(30) Foreign Application Priority Data

Jul. 20, 2000 (AU) ............................................. PQ8907

(51) Int. Cl.⁷ .............................................. C21B 13/00
(52) U.S. Cl. ............................. 75/502; 75/500; 75/501; 266/172
(58) Field of Search .................... 266/172, 44; 75/500, 75/501, 502

(56) References Cited

U.S. PATENT DOCUMENTS

| | | | |
|---|---|---|---|
| 5,251,879 A | 10/1993 | Floyd | |
| 5,498,277 A | 3/1996 | Floyd et al. | |
| 6,083,296 A | 7/2000 | Innes et al. | |
| 6,143,054 A | * 11/2000 | Dry | 75/500 |
| 6,379,424 B1 | * 4/2002 | Dry | 75/500 |
| 6,482,249 B1 | * 11/2002 | Dry | 75/502 |
| 2001/0015516 A1 | * 8/2001 | Dunne | 266/216 |
| 2001/0020758 A1 | * 9/2001 | Gurr et al. | 266/45 |
| 2001/0022417 A1 | * 9/2001 | Burrow | 266/122 |

FOREIGN PATENT DOCUMENTS

| | | |
|---|---|---|
| AU | B-23414/97 | 9/1998 |
| AU | B-11330/97 | 8/1999 |
| WO | WO 96/31627 | 10/1996 |
| WO | WO 00/01854 | 1/2000 |
| WO | WO 00/01855 | 1/2000 |

* cited by examiner

*Primary Examiner*—Scott Kastler
(74) *Attorney, Agent, or Firm*—Miles & Stockbridge P.C.; John C. Kerins

(57) ABSTRACT

A direct smelting process for producing iron and/or ferroalloys is provided, which involves injecting feed materials into a molten bath of molten metal in a metallurgical vessel to form an expanded molten bath zone, and injecting oxygen containing gas, wherein the selection of the number of, and position of, the solids injection and oxygen gas injection lances is such that the expanded molten bath zone includes a raised region around the oxygen gas injection region, and such that splashes, droplets and streams of molten material project upwardly from the raised region, and such that a free space forms around a lower end of the oxygen gas injection lance.

24 Claims, 1 Drawing Sheet

DIRECT SMELTING PROCESS AND APPARATUS

BACKGROUND OF THE INVENTION

The present invention relates to a process and an apparatus for producing iron and/or ferroalloys from ferruginous material, including iron ores, other ores containing iron such as chromite ores, partially reduced ores, and iron-containing waste streams such as steel reverts.

The present invention relates particularly to a molten metal bath-based direct smelting process and an apparatus for producing molten iron and/or ferroalloys.

DESCRIPTION OF RELATED ART

One known molten bath-based direct smelting process for producing molten iron is the DIOS process. The DIOS process includes a pre-reduction stage and a smelt reduction stage. In the DIOS process ore (−8 mm) is pre-heated (750° C.) and pre-reduced (10 to 30%) in bubbling fluidised beds using offgas from a smelt reduction vessel which contains a molten bath of iron and slag, with the slag forming a deep layer on the iron. The fine (−0.3 mm) and coarse (−8 mm) components of the ore are separated in the pre-reduction stage of the process and the −0.3 mm component is collected in a cyclone and injected into the smelt reduction vessel with nitrogen whilst the coarse ore is charged by gravity. Pre-dried coal is charged directly to the smelt reduction vessel from the top of the vessel. The coal decomposes into char and volatile matter in the slag layer and the ore dissolves in the molten slag and forms FeO. The FeO is reduced at the slag/iron and slag/char interfaces to produce iron. The carbon monoxide generated at the iron/slag and slag/char interfaces generates a foaming slag. Oxygen is blown through a specially designed lance that introduces the oxygen inside the foamed slag and improves secondary combustion. Oxygen jets burn carbon monoxide that is generated with the smelting reduction reactions, thereby generating heat that is transferred first to the molten slag and then to the slag/iron interface by the strong stirring effect of bottom blowing gas. The stirring gas introduced into the hot iron bath from the bottom or side of the smelt reduction vessel improves heat transfer efficiency and increases the slag/iron interface for reduction and therefore the vessel productivity and thermal efficiency. However, injection rates must be limited as strong stirring lowers secondary combustion due to increased interaction between the oxygen jet and iron droplets in the slag with subsequent lowering of productivity and increased refractory wear. Slag and iron are tapped periodically.

Another known direct smelting process for producing molten iron is the Romelt process. The Romelt process is based on the use of a large volume, highly agitated slag bath as the medium for smelting metalliferous feed material to iron in a smelt reduction vessel and for post-combusting gaseous reaction products and transferring the heat as required to continue smelting metalliferous feed material. The metalliferous feed material, coal, and fluxes are gravity fed into the slag bath via an opening in the roof of the vessel. The Romelt process includes injecting a primary blast of oxygen-enriched air into the slag via a lower row of tuyeres to cause necessary slag agitation and injection of oxygen-enriched air or oxygen into the slag via an upper row of tuyeres to promote post-combustion. The molten iron produced in the slag moves downwardly and forms an iron layer and is discharged via a forehearth. In the Romelt process the iron layer is not an important reaction medium.

Another known direct smelting process for producing molten iron is the AISI process. The AISI process includes a pre-reduction stage and a smelt reduction stage. In the AISI process pre-heated and partially pre-reduced iron ore pellets, coal or coke breeze and fluxes are top charged into a pressurised smelt reactor which contains a molten bath of iron and slag. The coal devolatilises in the slag layer and the iron ore pellets dissolve in the slag and then are reduced by carbon (char) in the slag. The process conditions result in slag foaming. Carbon monoxide and hydrogen generated in the process are post combusted in or just above the slag layer to provide the energy required for the endothermic reduction reactions. Oxygen is top blown through a central, water cooled lance and nitrogen is injected through tuyeres at the bottom of the reactor to ensure sufficient stirring to facilitate heat transfer of the post combustion energy to the bath. The process offgas is de-dusted in a hot cyclone before being fed to a shaft type furnace for pre-heating and pre-reduction of the pellets to FeO or wustite.

Another known direct smelting process, which relies on a molten iron layer as a reaction medium, and is generally referred to as the HIsmelt process, is described in International application PCT/AU96/00197 (WO 96/31627) in the name of the applicant.

The HIsmelt process as described in the International application includes:

(a) forming a bath of molten iron and slag in a vessel;
(b) injecting into the bath:
  (i) metalliferous feed material, typically iron oxides; and
  (ii) a solid carbonaceous material, typically coal, which acts as a reductant of the iron oxides and a source of energy; and
(c) smelting the metalliferous feed material to metal in the iron layer.

The HIsmelt process also includes injecting oxygen-containing gas into a space above the bath and post-combusting reaction gases, such as CO and $H_2$, released from the bath and transferring the heat generated to the bath to contribute to the thermal energy required to smelt the metalliferous feed materials.

The HIsmelt process also includes forming a transition zone in the space above the nominal quiescent surface of the bath in which there is a favourable mass of ascending and thereafter descending droplets or splashes or streams of molten material which provide an effective medium to transfer to the bath the thermal energy generated by post-combusting reaction gases above the bath.

The HIsmelt process as described in the International application is characterised by forming the transition zone by injecting a carrier gas, metalliferous feed material, and solid carbonaceous material into the bath through a section of the side of the vessel that is in contact with the bath and/or from above the bath so that the carrier gas and the solid material penetrate the bath and cause molten material to be projected into the space above the surface of the bath.

The HIsmelt process as described in the International application is an improvement over earlier forms of the HIsmelt process which form the transition zone by bottom injection of gas and/or carbonaceous material into the bath which causes droplets and splashes and streams of molten material to be projected from the bath.

SUMMARY OF THE INVENTION

The applicant has carried out extensive research and development work on direct smelting processes including research and development work on the requirements for commercially operating processes and has made a series of significant findings in relation to such processes.

In general terms, the present invention is a direct smelting process for producing iron and/or ferroalloys which operates on a commercial scale in a metallurgical vessel that has a hearth, side walls, and a roof, and a minimum width dimension of the interior of the hearth of at least 4 meters, more preferably at least 6 meters.

In more specific terms, the process includes the steps of:

(a) injecting feed materials being solid material and carrier gas into a molten bath of molten metal and molten slag through three or more downwardly extending solids injection lances and thereby generating a gas flow which causes:

(i) the formation of an expanded molten bath zone; and (ii) splashes, droplets and streams of molten material to be projected upwardly from the expanded molten bath zone; and (b) injecting an oxygen-containing gas into a region of the vessel via at least one oxygen gas injection lance and post-combusting combustible gases released from the molten bath.

In more specific terms the present invention is characterised by selecting the numbers of solids injection and oxygen gas injection lances and the relative positions of these lances and controlling process operating conditions including rates of injection of feed materials and oxygen-containing gas through the lances in steps (a) and (b) above so that:

(i) the expanded molten bath zone includes a raised region around the oxygen gas injection region of the vessel between the oxygen gas injection region and the side walls;

(ii) splashes, droplets and streams of molten material project upwardly from the raised region and form a curtain around the oxygen gas injection region between the oxygen gas injection region and the side walls and wet the side walls; and (iii) a "free" space forms around a lower end of the or each oxygen gas injection lance, the free space having a concentration of molten material that is lower than the molten material concentration in the expanded molten bath zone.

The above-described process results in the injection of feed materials being solid material and carrier gas into a number of regions in the molten bath that are located around the oxygen gas injection region of the vessel. The present invention relies on upward gas flow from these regions of high concentration of injected solid material and carrier gas that is sufficient to lift the molten bath that is above the regions and to eject some of the molten material into a top space of the vessel.

The uplift of molten material causes the formation of the above-described raised region of the expanded molten bath zone and the above-described curtain of splashes, droplets and streams of molten material projected from the raised region.

The splashes, droplets and streams of molten material may also be described as "fingers".

The uplift of molten material may be also described as being in the form of a series of fountains of molten material extending upwardly from the regions of high concentration of solids/carrier gas injection into the molten bath.

The present invention also relies on selecting the locations of the solids and oxygen gas injection lances so that the raised region of the expanded molten bath zone and the projected splashes, droplets or streams of molten material of these fountains form around the oxygen gas injection region of the vessel.

The purpose of the above-described raised region of the expanded molten bath zone and the above-described curtain of molten material projected from the raised region around the oxygen gas injection region is to:

(a) optimise post combustion by providing a space between the or each oxygen gas injection lance and the raised region/curtain for entrainment and mixing of bath gas and injected oxygen-containing gas;

(b) providing a medium for high rates of heat transfer of the resultant combustion energy to the molten bath;

(c) providing a medium, ie the raised region/curtain, to lower vessel heat losses; and (d) minimising reactions between iron and slag droplets and oxygen-containing gas that lowers post combustion.

Preferably the downwardly extending solids injection lances are positioned so that lines drawn vertically downwardly from outlet ends of the lances intersect a base of the hearth at a number of locations on a circle.

Preferably step (a) includes injecting feed materials with sufficient momentum so that the regions of high concentration of injected solid materials are within the circle.

More preferably the circle has a diameter that is greater than or equal to $2/3$'s of the diameter of the base of the hearth.

The raised region may be continuous or discontinuous.

The curtain may be continuous or discontinuous.

Preferably the oxygen gas injection region is a central region of the vessel.

Preferably there are at least four solids injection lances.

The expanded molten bath zone is characterised by a high volume fraction of gas voidages throughout the molten material in the zone.

Preferably the volume fraction of gas is at least 30% by volume of the expanded molten bath zone.

The gas flow generated in step (a) causes substantial movement of material within the molten bath and strong mixing of the molten bath.

The injection of feed materials and the gas flow arising from the injection of the feed materials and reactions of the feed materials in the molten bath causes substantial movement of material into and from the expanded molten bath zone.

Preferably a metal-rich zone forms in a lower region of the hearth and the expanded molten bath zone forms on the metal-rich zone.

Preferably the process includes periodically or continuously tapping molten slag from the vessel.

Preferably the process also includes periodically or continuously tapping molten iron and/or ferroalloys from the vessel.

The feed materials injected in step (a) may include any suitable ferruginous materials, including iron ores, other ores containing iron such as chromite ores, partially reduced ores, and iron-containing waste streams such as steel reverts. It is noted that whilst ferrous material, ie material in which iron is the principal component, is the preferred ferruginous material, the invention is not limited to the use of ferrous material.

Preferably the solid material includes ferrous material and/or solid carbonaceous material.

Preferably step (a) includes injecting at least 80% by weight of the total weight of solid material required to operate the process through the solids injection lances.

Preferably step (a) includes injecting feed materials into the molten bath at a velocity of at least 40 m/s through the solids injection lances.

Preferably the velocity is in the range of 80–100 m/s.

Preferably step (a) includes injecting feed materials into the molten bath through the solids injection lances at a mass flow rate of up to 2.0 t/m²/s where m² relates to the cross-sectional area of the lance delivery tube.

Preferably step (a) includes injecting feed materials into the molten bath through the solids injection lances at a solids/gas ratio of 10–18 kg/Nm³.

Preferably the oxygen-containing gas is air or oxygen-enriched air.

Preferably the process includes injecting air or oxygen-enriched air into the vessel at a temperature of 800–1400° C. and at a velocity of 200–600 m/s via the oxygen gas injection lance or lances.

Preferably the concentration of molten material in the free space around the lower end of the oxygen gas injection lance is 5% or less by volume of the space.

Preferably the free space around the lower end of the lance is a semi-spherical volume that has a diameter that is at least 2 times the outer diameter of the lower end of the lance.

Preferably the free space around the lower end of the lance is no more than 4 times the outer diameter of the lower end of the lance.

Preferably at least 50%, more preferably at least 60%, by volume of the oxygen in the air or oxygen enriched air is combusted in the free space around the lower end of the lance.

Preferably the process includes injecting air or oxygen-enriched air into the vessel in a swirling motion.

In the context of the present invention the term "smelting" is understood herein to mean thermal processing wherein chemical reactions that reduce the feed materials take place to produce liquid iron and/or ferroalloys.

Preferably the gas flow generated in the molten bath in step (a) is at least 0.35 Nm³/s/m² (where m² relates to the area of a horizontal cross section through the hearth at its minimum width).

Preferably the gas flow generated in the molten bath in step (a) is at least 0.5 Nm³/s/m².

Preferably the gas flow rate generated in the molten bath in step (a) is less than 2 Nm³/s/m².

The gas flow generated in the molten bath may be generated in part as a result of bottom and/or side wall injection of a gas into the molten bath.

The molten material may form a "wet" layer or a "dry" layer on the side walls. A "wet" layer comprises a frozen layer that adheres to the side walls, a semi-solid (mush) layer, and an outer liquid film. A "dry" layer is one in which substantially all of the slag is frozen.

The production of slag in the vessel may be controlled by varying the feed rates of metalliferous feed material, carbonaceous material, and fluxes to the vessel and operating parameters such as oxygen-containing gas injection rates.

In situations where the process is concerned with producing iron, preferably the process includes controlling the level of dissolved carbon in molten iron to be at least 3 wt % and maintaining the slag in a strongly reducing condition leading to iron oxide levels of less than 6 wt %, more preferably less than 5 wt % (measured as the amount of iron in iron oxides in the slag tapped from the vessel).

The injection of ferrous material and carbonaceous material may be through the same or separate lances.

Preferably the level of post-combustion is at least 40%, where post-combustion is defined as:

$$\frac{[CO_2] + [H_2O]}{[CO_2] + [H_2O] + [CO] + [H_2]}$$

where:
 [$CO_2$]=volume % of $CO_2$ in off-gas
 [$H_2O$]=volume % of $H_2O$ in off-gas
 [$CO$]=volume % of CO in off-gas
 [$H_2$]=volume % of $H_2$ in off-gas In general terms the present invention also provides an apparatus which produces iron and/or ferroalloys by a direct smelting process, which apparatus includes a fixed non-tiltable vessel that has a hearth, side walls, and a roof, and a minimum width dimension of at least 4 meters, preferably at least 6 meters, in the interior of the hearth and contains a molten bath of iron and slag that includes a metal-rich zone and an expanded molten bath zone above the metal-rich zone.

In more specific terms:
  (a) the hearth is formed of refractory material and has a base and sides in contact with the molten metal;
  (b) the side walls extend upwardly from the sides of the hearth and are in contact with the expanded molten bath zone and the gas continuous space, wherein the side walls that contact the gas continuous space include water cooled panels and a layer of molten material on the panels;
  (c) at least one lance extending downwardly into the vessel and injecting oxygen-containing gas into a region of the vessel above the molten bath;
  (d) at least three solids injection lances injecting feed materials being ferrous material and/or carbonaceous material and carrier gas into the molten bath, preferably into the metal-rich zone of the molten bath; and
  (e) a means for tapping molten metal and slag from the vessel.

In more specific terms the numbers of the solids injection and oxygen gas injection lances and the relative positions of these lances and the operating conditions of the process are selected so that:
  (i) the expanded molten bath zone includes a raised region around the oxygen gas injection region of the vessel between the oxygen gas injection region and the side walls;
  (ii) splashes, droplets and streams of molten material project upwardly from the raised region and form a curtain around the oxygen gas injection region between the oxygen gas injection region and the side walls and wet the side walls; and
  (iii) a "free" space forms around a lower end of the or each oxygen gas injection lance, the free space having a concentration of molten material that is lower than the molten material concentration in the expanded molten bath zone.

Preferably the solids injection lances are elongate and extend through water cooled panels in the side walls of the vessel and downwardly and inwardly to the hearth region of the vessel.

Preferably the hearth defines a cylindrical region within the vessel and the downwardly extending solids injection lances are positioned so that lines drawn vertically downwardly from outlet ends of the lances intersect the base of the hearth at a number of locations on a circle within the hearth.

More preferably the circle has a diameter that is greater than or equal to ⅔'s of the diameter of the base of the hearth.

Preferably the oxygen gas injection region is a central region of the vessel.

More preferably the side walls include:

(a) an upper barrel section which defines a cylindrical region within the vessel of larger diameter than that of the region defined by the hearth; and (b) a lower barrel section which includes an inner lining of refractory material and defines a frusto-conical region within the vessel.

The frusto-conical region provides a transition between the hearth and the upper barrel regions.

Preferably the solids injection lances extend at least one meter, more preferably at least 1.5 meters, into the vessel and are self-supporting along that length.

The number of solids injection lances may vary as required depending on the hearth dimensions. By way of example, in a situation where the hearth is generally cylindrical with a diameter of 4 meters preferably there is a minimum of four solids injection lances. Where the hearth diameter is 6 meters, preferably there is a minimum of six solids injection lances. Where the hearth diameter is 8 meters, preferably there is a minimum of eight solids injection lances. The number of solids injection lances may, within practical limits, also be varied by changing their size so as to increase the individual throughput of material.

Preferably the solids injection lances are equi-spaced around the circumference of the vessel.

The present invention is described further by way of example with reference to the accompanying drawing which is a vertical section illustrating in schematic form a preferred embodiment of the process and the apparatus of the present invention.

The following description is in the context of smelting iron ore to produce molten iron and it is understood that the present invention is not limited to this application and is applicable to a smelting any suitable feed materials.

BRIEF DESCRIPTION OF THE DRAWINGS

The present invention is described further by way of example with reference to the accompany drawing wherein.

DETAILED DESCRIPTION OF THE PREFERRED EMBODIMENTS

Figure 1:
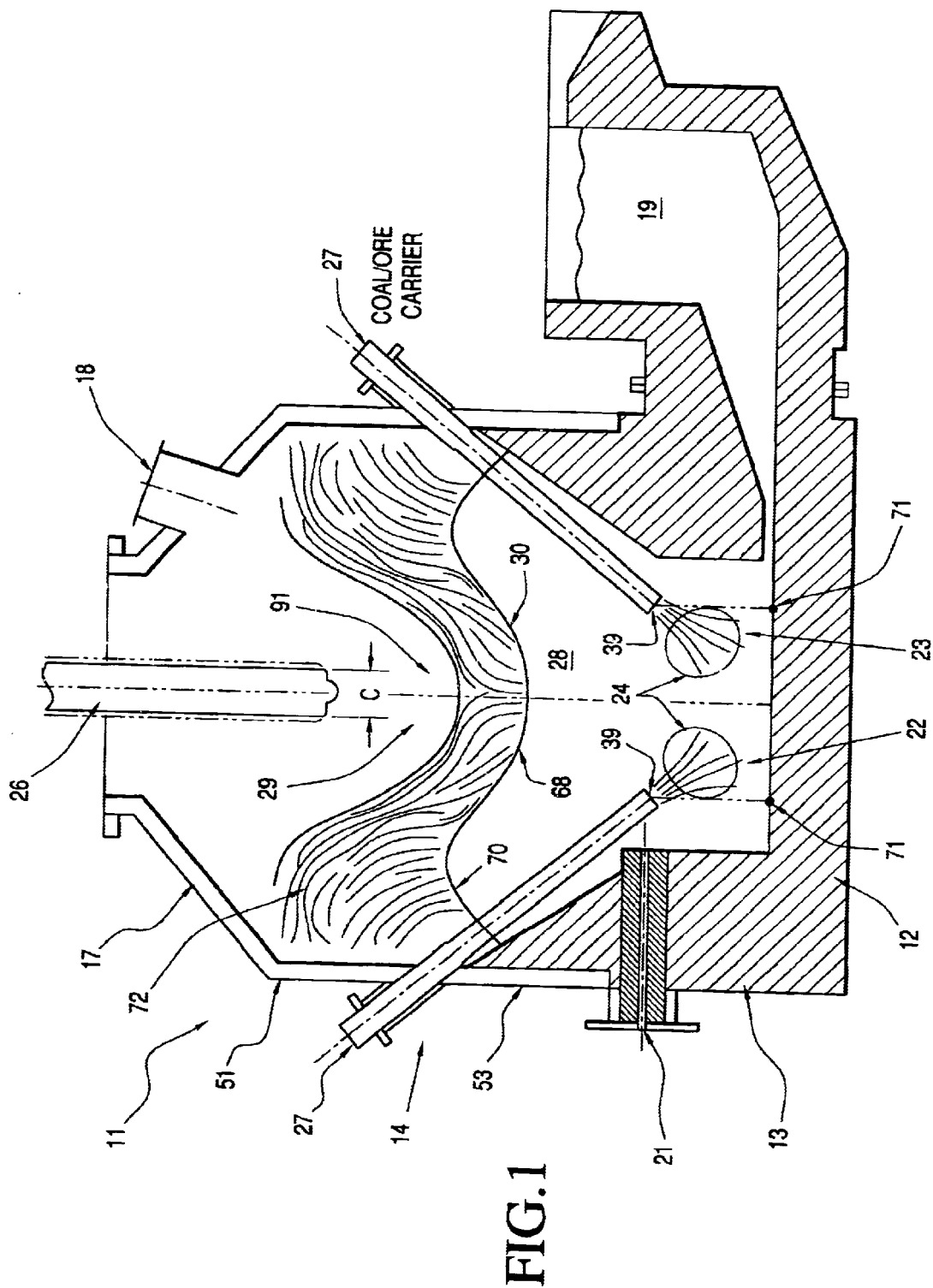
FIG. 1 is a vertical section illustrating in schematic form a preferred embodiment of the process and the apparatus of the present invention.

The direct smelting apparatus shown in the figure includes a metallurgical vessel denoted generally as 11. The vessel 11 has a hearth that incudes a base 12 and sides 13 formed from refractory bricks; side walls 14 which form a generally cylindrical barrel extending upwardly from the sides 13 of the hearth and which includes an upper barrel section 51 formed from water cooled panels and a lower barrel section 53 formed from water cooled panels having an inner lining of refractory bricks; a roof 17; an outlet 18 for off-gases; a forehearth 19 for discharging molten iron continuously; and a tap-hole 21 for discharging molten slag.

The hearth and the upper barrel section 51 define cylindrical regions within the vessel. The lower barrel section 53 defines a generally frusto-conical cylindrical region within the vessel which provides a transition between the narrower diameter hearth and the wider diameter upper barrel section 51. In a commercial scale plant, ie a plant producing at least 500,000 tonnes/year of molten iron, the diameter of the hearth is at least 4 meters, more preferably at least 6 meters.

It is noted that the present invention is not limited to this vessel geometry and extends to any other suitably shaped and sized vessel for producing molten metal on a commercial scale.

In use, the vessel contains a molten bath of iron and slag.

The vessel is fitted with a downwardly extending hot air injection lance 26 for delivering a hot air blast into a central, upper region 91 of the vessel and post-combusting reaction gases released from the molten bath. The lance 26 has an outer diameter D at a lower end of the lance. The lance 26 is located so that:

(i) a central axis of the lance 26 is at an angle of 20 to 90° relative to a horizontal axis (the lance 26 shown in FIG. 1 is at an angle of 90°);

(ii) the lance 26 extends into the vessel a distance that is at least the outer diameter D of the lower end of the lance; and (iii) the lower end of the lance 26 is at least 3 times the outer diameter D of the lower end of the lance above the quiescent surface (not shown) of the molten bath.

The term "quiescent surface" is understood to mean the surface of the molten bath when there is no injection of gas and solids into the vessel.

It is noted that, depending on a range of inter-related factors, including the size and geometry of the vessel, there may be more than one lance 26.

The vessel is also fitted with six solids injection lances 27 (only two of which are shown in the figure) extending downwardly and inwardly through the side walls 14 and into the molten bath at an angle of 20–70° to the horizontal for injecting feed materials being iron ore, solid carbonaceous material, and fluxes entrained in an oxygen-deficient carrier gas into the molten bath.

The lances 27 are positioned so that outlet ends 39 of the lances 27 are equi-spaced apart around the central axis of the vessel. In addition, the lances are positioned so that lines drawn vertically down from the outlet ends 39 intersect the base 12 of the hearth at locations 71 on a circle that has a diameter of the order of $\frac{2}{3}$ of the diameter of the hearth.

It is noted that the position on the lances 27 is selected in the context of the position of the oxygen lance 26 and the objective of forming a curtain 72 of molten material at least substantially around the lance 26 and between the side walls 14 of the vessel and the lance 26 and that a different arrangement of lances 27 may be more appropriate to achieve this objective in a different vessel/lance 26 configuration. Specifically, it is noted that the present invention is not limited to arrangements in which the lance 26 is centrally located.

In use, iron ore, solid carbonaceous material (typically coal), and fluxes (typically lime and magnesia) entrained in a carrier gas (typically $N_2$) are injected into the molten bath via the lances 27 at a velocity of at least 40 m/s, preferably 80–100 m/s. The momentum of the solid material/carrier gas carries the solid material and gas towards the base 12 of the hearth into regions (the circled regions indicated by the numeral 24) that are spaced around the central axis of the vessel. These regions are referred to in the following description as regions 24 of high concentration of solids/gas injection. The coal is devolatilised and thereby produces gas. Carbon partially dissolves into the metal and partially remains as solid carbon. The iron ore is smelted to metal and the smelting reaction generates carbon monoxide gas. The gases transported into the molten bath and generated via devolatilisation and smelting produce significant buoyancy uplift of molten material (including metal and slag) and solid carbon from the molten bath.

The buoyancy uplift of molten material and solid carbon causes substantial agitation in the molten bath, particularly immediately above and outwardly spaced from the regions 24 of high concentration of solids/gas injection, with the result that an expanded molten bath zone 28 that has a surface indicated by the arrow 30 forms. More particularly, the surface of the expanded molten bath zone 28 forms an annular raised region 70 between the central region 91 and the vessel side walls 14. The extent of agitation is such that there is substantial movement of molten material within the expanded molten bath zone 28 and strong mixing of the molten material within this zone to the extent that there is reasonably uniform temperature—typically, 1450–1550° C. with a temperature variation of the order of 30° throughout the zone.

Notwithstanding the strong mixing of molten material in the expanded molten bath zone 28, molten iron progressively settles towards the lower part of the hearth and forms a metal-rich zone 23 and is continuously removed via the forehearth 19.

The interface between the expanded molten bath zone 28 and the metal-rich zone 23 is determined largely by the regions 24 of high concentration of solids/gas injection. The substantial upward movement of molten material from these regions is compensated for by the continual supply of further feed materials via the lances 27 and the downward movement of already-molten material.

In addition, the upward gas flow from the regions 24 of high concentration of solids/gas injection projects some molten material (predominantly slag) as splashes, droplets and streams beyond the raised region 70 of the expanded molten bath zone 28 and forms the above-described curtain 72. The molten material in the curtain 72 contacts the upper barrel section 51 of the side walls 14 that is above the expanded molten bath zone 28 and the roof 17.

In general terms, the expanded molten bath zone 28 is a liquid continuous volume, with gas voids therein.

The above-described movement of molten material can be visualised as a series of fountains originating from the regions of high concentration of solids/gas injection which forms the raised region 70 of the expanded molten bath zone 28 and the curtain 72 of molten material.

In addition to the above, in use, hot air at a temperature of 800–1400° C. and a velocity of 200–600 m/s is injected into the central region 91 of the vessel via lance 26 and deflects upwardly projected molten material in that region and causes an essentially metal/slag free space 29 to form around the end of the lance 26. This downward blast of hot air contributes to shaping projected molten material into the above-described curtain 72.

The position of the lances 27 is selected so that their outlet ends 39 are above the surface of the metal-rich zone 23 during operation of the process. This position of the lances 27 reduces the risk of damage through contact with molten metal and also makes it possible to cool the lances by forced internal water cooling without significant risk of water coming into contact with the molten metal in the vessel. Specifically, the position of the lances 27 is selected so that the outlet ends 28 are in the range of 150–1500 mm above the surface of the metal-rich zone 23 under quiescent conditions. In this connection, it is noted that, whilst the lances 27 are shown in the figure as extending into the vessel, the outlet ends of the lances 27 may be flush with the side wall 14.

The hot air blast via the lance 26 post-combusts reaction gases CO and $H_2$ in the free space 29 around the end of the lance 26 and in the surrounding molten material and generates high temperatures of the order of 2000° C. or higher. The heat is transferred to the molten material in the region of gas injection and the heat is then partially transferred via the molten material to the metal-rich zone 23.

The free space 29 is important to achieving high levels of post combustion because it enables entrainment of gases in the space above the expanded molten bath zone 28 into the end region of the lance 26 and thereby increases exposure of available reaction gases to post combustion.

The curtain 72 is also important in providing a partial barrier to radiation energy from the post combustion jet to the side walls 14.

Moreover, the ascending and descending droplets, splashes and streams of molten material within the curtain 72 are an effective means of transferring heat generated by post combustion to the molten bath.

It is to be understood that this invention is in no way limited to the details of the illustrated construction and that many modifications and variations will fall within the spirit and scope of the invention.

What is claimed is:

1. A direct smelting process for producing iron and/or ferroalloys which operates on a commercial scale in a metallurgical vessel that has a hearth, side walls, and a roof, and a minimum width dimension of the interior of the hearth of at least 4 meters, which process includes the steps of:
   (a) injecting feed materials being solid material and carrier gas into a molten bath of molten metal and molten slag through three or more downwardly extending solids injection lances and thereby generating a gas flow which causes:
      (i) the formation of an expanded molten bath zone; and
      (ii) splashes, droplets and streams of molten material to be projected upwardly from the expanded molten bath zone; and
   (b) injecting an oxygen-containing gas into a region of the vessel via at least one oxygen gas injection lance and post-combusting combustible gases released from the molten bath;
   and which process is characterised by selecting the numbers of solids injection and oxygen gas injection lances and the relative positions of these lances and controlling process operating conditions including rates of injection of feed materials and oxygen-containing gas through the lances in steps (a) and (b) above so that:
      (i) the expanded molten bath zone includes a raised region around the oxygen gas injection region of the vessel between the region and the side walls;
      (ii) splashes, droplets and streams of molten material project upwardly from the raised region and form a curtain around the oxygen gas injection region between the region and the side walls and wet the side walls; and
      (iii) a space forms around a lower end of the or each oxygen gas injection lance, the free space having a concentration of molten material that is lower than the molten material concentration in the expanded molten bath zone.

2. The process defined in claim 1 wherein the gas flow generated in step (a) causes substantial movement of material within the molten bath and strong mixing of the molten bath.

3. The process defined in claim 1 wherein the injection of feed materials in step (a) and the gas flow generated by the injection of the feed materials and reactions of the feed materials in the molten bath causes substantial movement of material into and from the expanded molten bath zone.

4. The process defined in claim 1 includes periodically tapping molten slag from the vessel.

5. The process defined in claim 1 includes continuously tapping molten metal from the vessel.

6. The process defined in claim 1 includes periodically tapping molten iron and/or ferroalloys from the vessel.

7. The process defined in claim 1 includes continuously tapping molten iron and/or ferroalloys from the vessel.

8. The process defined in claim 1 wherein step (a) includes injecting at least 80% by weight of the total weight of solid material required to operate the process through the solids injection lances.

9. The process defined in claim 1 wherein step (a) includes injecting feed materials into the molten bath at a velocity of at least 40 m/s through the solids injection lances.

10. The process defined in claim 1 wherein the velocity is in the range of 80–100 m/s.

11. The process defined in claim 1 wherein step (a) includes injecting feed materials into the molten bath through the solids injection lances at a mass flow rate of up to 2.0 t/m$^2$/s where m$^2$ relates to the cross-sectional area of the lance delivery tube.

12. The process defined in claim 1 wherein step (a) includes injecting feed materials into the molten bath through the solids injection lances at a solids/gas ratio of 10–18 kg/Nm$^3$.

13. The process defined in claim 1 wherein step (b) includes injecting air or oxygen-enriched air as the oxygen-containing gas into the vessel at a temperature of 800–1400° C. and at a velocity of 200–600 m/s via the oxygen gas injection lance or lances.

14. The process defined in claim 1 includes injecting air or oxygen-enriched air as the oxygen-containing gas into the vessel in a swirling motion in step (b).

15. The process defined in claim 1 wherein step (a) generates gas flow of at least 0.35 Nm$^3$/s/m$^2$ (where m$^2$ relates to the area of a horizontal cross section through the hearth at its minimum width).

16. The process defined in claim 15 wherein step (a) generates gas flow of at least 0.5 Nm$^3$/s/m$^2$.

17. The process defined in claim 15 wherein step (a) generates gas flow of less than 2 Nm$^3$/s/m$^2$.

18. An apparatus which produces iron and/or ferroalloys by a direct smelting process, which apparatus includes:
 (a) a fixed non-tiltable vessel that contains a molten bath of metal and slag that includes a metal-rich zone and a expanded molten bath zone above the metal-rich zone, which vessel has a hearth formed of refractory material and having a minimum internal width dimension of at least 4 meters, side walls extending upwardly from the hearth in contact with the expanded molten bath zone and the gas continuous space, wherein the side walls that contact the gas continuous space include water cooled panels and a layer of molten material on the panels and a roof;
 (b) at least one lance extending downwardly into the vessel and injecting oxygen-containing gas into a region of the vessel above the molten bath;
 (c) at least three solids injection lances injecting feed materials and carrier gas into the molten bath; and
 (d) a means for tapping molten metal and slag from the vessel.

19. The apparatus defined in claim 18 wherein the solids injection lances are elongate and extend through water cooled panels in the side walls of the vessel and downwardly and inwardly to the hearth region of the vessel.

20. The apparatus defined in claim 18 wherein the hearth defines a cylindrical region within the vessel and the downwardly extending solids injection lances are positioned so that lines drawn vertically downwardly from outlet ends of the lances intersect the base of the hearth at a number of locations on a circle within the hearth.

21. The apparatus defined in claim 20 wherein the circle has a diameter that is greater than or equal to ⅔'s of the diameter of the width of the hearth.

22. The apparatus defined in claim 18 wherein the oxygen gas injection region is a central region of the vessel.

23. The apparatus defined in claim 18 wherein the side walls include:
 (a) an upper barrel section which defines a cylindrical region within the vessel of larger diameter than that of the region defined by the hearth; and
 (b) a lower barrel section which includes an inner lining of refractory material and defines a frusto-conical region within the vessel, the frusto-conical region forming a transaction between the upper barrel section and the hearth.

24. The apparatus defined in claim 18, wherein the solids injection lances extend at least one meter into the vessel and are self-supporting along that length.

* * * * *